Sept. 27, 1960 H. H. DRAKE 2,954,545
REMOTE CONTROL SYSTEM
Filed April 10, 1958 2 Sheets-Sheet 1

Inventor
Hugh Drake
By Francis W. Crotty
Attorney

Sept. 27, 1960 H. H. DRAKE 2,954,545

REMOTE CONTROL SYSTEM

Filed April 10, 1958 2 Sheets-Sheet 2

Inventor
Hugh Drake
By Francis W. Crotty
Attorney 2,954,545

REMOTE CONTROL SYSTEM

Hugh H. Drake, Elmhurst, Ill., assignor to Zenith Radio Corporation, a corporation of Delaware Filed Apr. 10, 1958, Ser. No. 727,710

8 Claims. (Cl. 340—171)

This invention relates to remote control systems for selectively accomplishing any of a plurality of functions at a controlled or satellite station in response to command signals originated at a remotely located controlling station. More particularly, the invention is directed to enhancing the versatility and capabilities of such a system by arranging that the number of functions over which a control may be exercised is greater than the number of individual signal frequencies generated at the remote transmitter.

Remote control systems of the type under consideration are useful in a variety of installations both in the home and in industry. Familiar examples of home-type applications are control of radio and television receivers, garage doors, slide projectors, etc. Industrial uses are numerous, including work-handling devices in general, furnaces, metal-working apparatus and the like. For purpose of a specific disclosure of the invention, it is convenient to consider its application to a television receiver for use in the home.

A remote control system employing radiated command signals for adjusting any of several operating characteristics of a television receiver installed in the home is the subject of U.S. Letters Patent 2,817,025, issued December 17, 1957, in the name of R. Adler and assigned to the same assignee as the present invention. As there described, four command signals may be generated at the remote transmitter and propagated to the receiver. The signals have distinctly different frequencies but they are grouped within a very narrow or restricted portion of the frequency spectrum so that the control chassis may have a correspondingly narrow acceptance bandwidth and therefore be relatively free from the influence of interfering signals of other frequencies which may be present in the receiver location. By individualizing the frequencies of the transmitted command signals and by employing frequency selective channels in the receiver, it is possible to assign a given command signal frequency to the execution of a particular one of the several functions to be controlled. In the Adler patent, four different command signals may be selectively transmitted and they control four different functions in the television receiver.

The arrangement to be described herein is a further development of that system. It is characterized by the fact that at least five different receiver functions may be controlled by the same transmitter which generates only four individual signal frequencies.

It is a principal object of the invention, therefore, to provide a remote control system of increased versatility and capacity for effecting controlled functions in a controlled device.

It is a more specific object of the invention to provide a new and improved remote control system in which the number of control functions which may be accomplished exceeds the number of control signal frequencies that the command transmitting device may generate.

A remote control system constructed in accordance with the invention accomplishes three control functions in response to commands constituted of only two signals. The system comprises a receiver for accepting command signals, a first control channel coupled to the receiver to respond only to a particular one of the commands for developing a first control effect, and a second control channel likewise coupled to the receiver but responsive only to the other of the command signals for developing a second control effect. A third control channel is coupled to the receiver and is responsive only to the coincident reception of both the command signals to develop a third control effect. There are three utilizing devices coupled to the three channels respectively for performing any of three control functions in accordance with which of the controlled effects is instantaneously developed. The system is constituted to inhibit the first and second control effects upon development of the third control effect.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 2:
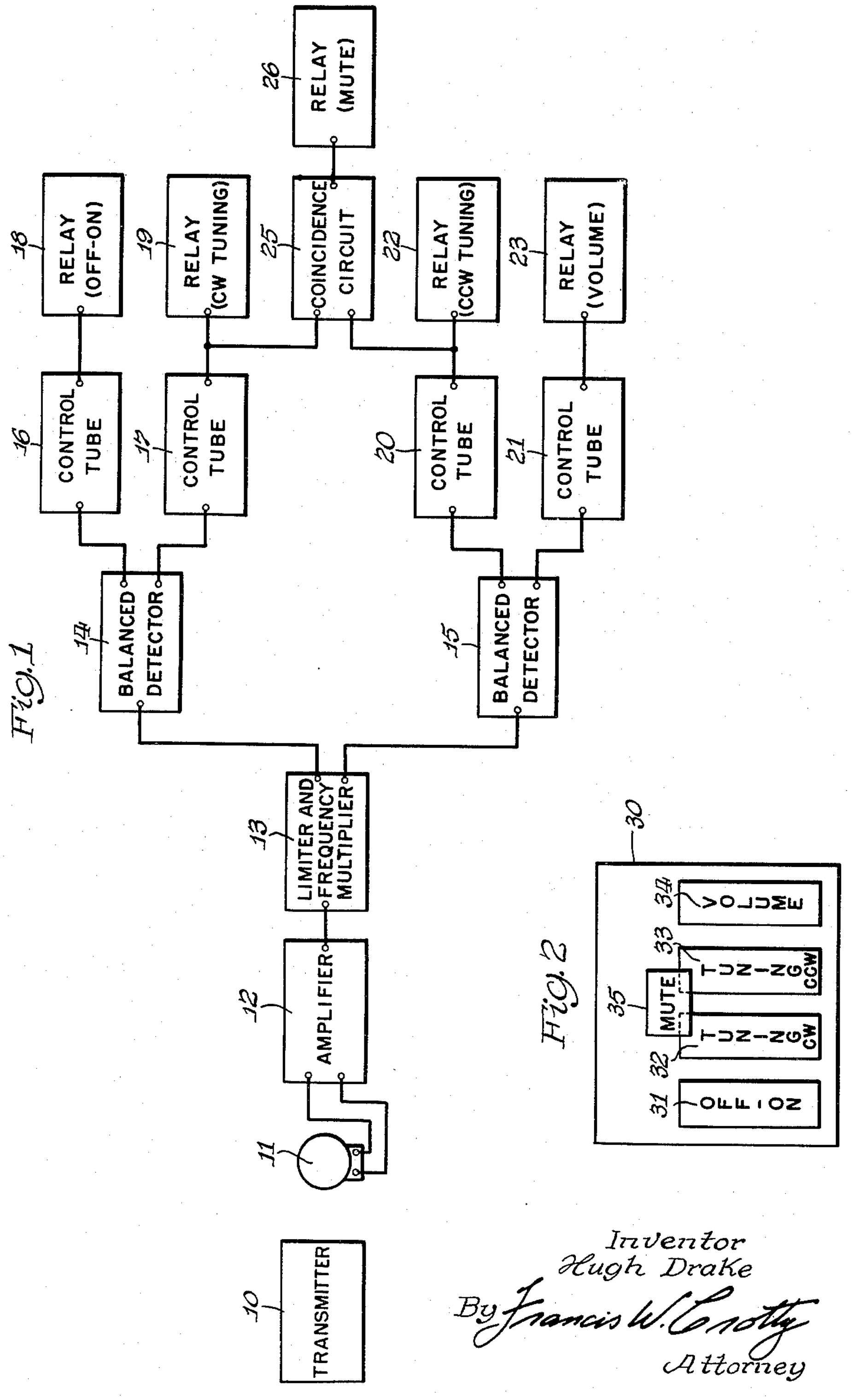
Figure 1 is a block diagram of a remote control system constructed in accordance with the invention.
Figure 2 represents a transmitter detail of the arrangement of Figure 1.

The remote control system of Figure 1, except for a particular control channel to be identified more particularly hereinafter, is essentially the same as that shown and described in the Adler patent to which reference may be had for structural details of the remote control transmitter, control chassis and most of the connections extending from the control chassis to a controlled television receiver. Since no novelty is predicated herein on those components per se, they have not been shown in detail and are incorporated herein by reference to the Adler patent. More particularly, the remote control system comprises a transmitter 10 for developing four ultrasonic acoustic signals of predetermined minimum amplitude and duration and individually having a unique frequency assignment within a narrow range of frequencies. In other words, the transmitter effectively includes four sonic generators each of which develops an acoustical signal of a particular frequency. Each such generator may comprise a passive longitudinal-mode mechanical vibrator in the form of a rod of aluminum or other material exhibiting relatively low internal damping. The physical length of the rod is equal to one-half the wavelength of sound in the rod material at a predetermined acoustic operating frequency. The use of four such rods, differing from one another in physical length, permits the generation of four sonic signals to be employed as commands which, while distinguishable from one another on a frequency basis, are grouped in a narrow band of frequencies. A striker is associated with a free end of each rod to be actuated by a pushbutton to strike the rod and establish it in longitudinal mechanical vibration. As mentioned, structural details of such a generator, particularizing as to the longitudinal-mode vibrator and its actuating mechanism, are disclosed in the Adler patent.

The control chassis to be associated with the controlled television receiver includes a device such as an electrostatic microphone 11 for accepting transmitted command signals issued by transmitter 10. An amplifier 12 is coupled to microphone 11 and preferably has a narrow acceptance band, restricted to embrace substantially only the group of frequencies radiated by transmitter 10. This selectivity permits the control chassis to reject signals other than the narrow portion of the frequency spectrum in which the commands are to be transmitted and endows the system with considerable freedom from false actuation. That is to say, interference which may be encountered at the receiving location and which is not within the narrow acceptance band of the control chassis is rejected and cannot result in inadvertent or false actuation or adjustment of the controlled receiver.

A limiter and frequency multiplier 13 is coupled to the output circuit of amplifier 12 to facilitate separation of the command signals within the control chassis and channelling of such signals in accordance with the particular function each is intended to control. While it is desirable to group the commands in a very narrow portion of the frequency spectrum to obtain freedom from false actuation as described, some difficulty in effecting signal separation on a frequency basis can be expected unless expensive crystal-type separating networks are relied upon or, alternatively, frequency multiplication is resorted to for the purpose of achieving much greater absolute separation of the signal frequencies in the control chassis. Unit 13 includes a frequency multiplier for the reason that it is a simple and inexpensive structure. Separation of the frequency-multiplied signals is accomplished by a pair of balanced detectors 14, 15 which are coupled to the output of limiter and multiplier 13.

As explained in the Adler patent, each detector has a peaked response at two separated frequencies and the circuit parameters are chosen so that a peak response for one pair of command signals is exhibited by detector 14 and a similar response for the remaining pair of control signals is exhibited by detector 15. Each detector has a balanced load circuit which develops a control effect in the form of a signal potential which has variations with frequency similar to the response in a frequency-selective detector. Accordingly, a signal voltage of maximum amplitude and positive polarity is attained across one-half of the load circuit at one of the pairs of signal frequencies to which each detector is to respond and a similar potential of maximum amplitude and positive polarity is derived across the other portion of the load circuit during reception of the other signal of that particular pair. These potentials actuate the control chassis and, for that purpose, each half of the load circuit of detector 14 connects to a different one of control tubes 16, 17 which, in turn, are coupled with a bistable relay 18 and a motor-controlling relay 19, respectively.

Detector 15, in similar fashion, is connected with control tubes 20, 21 which control a second motor relay 22 and a stepping relay 23.

As thus far described, the arrangement is identical with that of the Adler patent to which reference may be had for a more complete disclosure of details and operation. Accordingly, the operation of the system as a whole will be considered here only briefly.

Operation of a pushbutton actuator within transmitter 10 results in the generation and propagation of an ultrasonic signal of a preassigned and closely controlled frequency. That signal is intercepted by microphone 11, amplified in amplifier 12 and limited in amplitude and multiplied in frequency in unit 13. The multiplied frequency signal may be assumed to correspond to one of the peak response frequencies of balanced detector 14, more specifically, the frequency which results in a maximum response in the portion of the load circuit to which control tube 16 is coupled. In the presence of that signal, control tube 16 which is normally biased to anode current cut-off is rendered conductive to actuate bistable relay 18. If the receiver is in operation when the command signal is received, actuation of relay 18 turns it off and, conversely, were the receiver shut off by the instantaneous condition of relay 18, reception of the received signal would turn it on. In like fashion, any of remaining three command signals transmitted by transmitter 10 is channelled to one of the remaining control devices 17, 20 and 21 selectively to actuate relays 19, 22 and 23, all as described in the Adler patent. When relay 19 is energized, a driving motor which operates the channel selector rotates in a clockwise direction and drives a turret tuner to change the channel to which the receiver is tuned. Clockwise excitation of the driving motor changes the channel selection in a descending order from higher to lower channels. In like, but converse manner, operation of relay 22 effects counterclockwise rotation of the tuning motor and changes the selected channels in an ascending order.

Relay 23, when operated by control tube 21, adjusts the volume of sound reproduction in the controlled television receiver. This specific function has not been illustrated in the Adler patent, but will be well understood by anyone skilled in the art. For example, it is most convenient to adjust the volume in sequential and step-by-step fashion. Where this is to be accomplished, it is only necessary that the audio system of the controlled receiver include a tapped voltage divider in series with the usual volume-control potentiometer and a movable contact positioned by a stepping relay to move from one such tap to the next in sequential fashion to change the total impedance of the volume control network.

It will be apparent from the foregoing that the control system has one control channel including detector 14, control tube 16 and relay 18 coupled to microphone 11 and responsive only to one of the command signals for developing a first control effect, namely, the operation of the on-off condition of the receiver. Components 14, 17 and 19 define a second channel coupled to microphone 11 for developing another control effect, specifically, adjustment of channel selection in a clockwise direction. Components 15, 20 and 22 constitute a third channel, while components 15, 21 and 23 define a fourth channel, and each such channel develops its own control effect upon the reception of the command signal which is related in frequency to the particular frequency which occasions conductions within its control tube as required to actuate its particular relay. As thus far described, the system's capabilities are restricted to the accomplishment of four control functions and the requirement of four distinctly different command signals.

In accordance with the teachings of the present invention, the capabilities are increased by permitting the accomplishment of still additional control functions without the requirement of further control signal frequencies to be developed by transmitter 10. This is made possible by including within the system another control channel responsive only to the coincident reception of two of the command signals. This particular channel includes a coincident circuit 25 which may be any of a variety of well-known arrangements having a control tube normally biased to a condition of anode current cut-off but experiencing anode current only in the presence of a pair of received signals which are applied coincidently to that tube. A convenient form of circuit features a tube, such as a type 6BE6, which has a pair of independent control electrodes spaced along a common electron-discharge path. Each such electrode normally is subject to an operating bias which biases the tube to cut off but the application of a control signal of positive polarity to these electrodes at the same time overcomes the bias to permit conduction. Accordingly, where control signals are concurrently applied to the control electrodes, the control tube is rendered conductive. The two control signal inputs of coincidence circuit 25 are connected to the output circuits of control tubes 17 and 20, respectively. A further relay 26 is coupled to and controlled by coincidence circuit 25. In practical form, the energizing winding of relay 26 is included in the anode circuit of the 6BE6 control tube.

The operation of the system of Figure 1, modified by the inclusion of units 25 and 26 to constitute a fifth control channel is, during any operating interval in which a single command signal is received, the same as that described above and in the Adler patent. During the reception of two particular command signals, specifically those to which control tubes 17 and 20 respond, the control tube within coincidence circuit 25 is rendered conductive and relay 26 is operated. It is convenient to have this relay be a bistable device controlling muting of the sound in the controlled television receiver so that the sound may be selectively turned on and off at the will of the operator.

The arrangement of Figure 1 has enhanced capabilities in that the four signal-frequency transmitter 10 is now able to achieve control of five distinct and separate functions at the controlled receiver. Of course, still further control functions may be accomplished, in addition to the five already mentioned, by the utilization of other coincidence circuits with an associated relay controlled by each, so long as each added coincidence circuit is controlled by a different pair of control tubes 16, 17, 20 and 21. The system has the further advantage of sound muting (relay 26) independent of the volume control (relay 23). Other arrangements have been proposed for controlling both volume and sound muting but they have interrelated these functions in that muting is one of the sequential positions that the stepping relay, otherwise controlling volume, may assume in response to received signals. Such other proposals are subject to the inconvenience that operation of the sound muting necessitates stepping the volume control relay with a consequent change in sound volume. In other words, after the muting has been accomplished, it is necessary to readjust the volume to a desired level, whereas in the described arrangement, in which these functions are controlled separately, that inconvenience is obviated.

A convenient arrangement for controlling transmitter 10 is indicated in Figure 2. It is premised upon inclusion within transmitter 10 of an actuator construction disclosed and claimed in Patent No. 2,821,955 issued February 4, 1958, in the name of R. C. Ehlers et al. and assigned to the same assignee as the present invention. Reference to Ehler's patent shows that the pushbutton or manually-operated striker mechanism has pivot levers which are to be depressed selectively to excite any of the longitudinal-mode vibrators. Generally, each such actuator is provided with a legend denoting the function that the signal to be generated will occasion within the controlled receiver. Accordingly, as represented in Figure 2, the transmitter comprises a casing 30 which houses the four longitudinal-mode vibrators. Each may be set into vibration upon actuation of one of the manually-operable pivoted levers 31–34, inclusive. The function that any of these levers accomplishes, when it alone is actuated, is indicated by the legend inscribed thereon. There is a further actuator 35 to be operated when it is desired to mute the controlled receiver. It is mounted for movement in a plane normal to the plane of the drawing and it physically overlaps actuators 32, 33 to the end that depression of mute button 33 results in concurrent actuation of levers 32 and 33. Depressing levers 32 and 33 together and releasing them together through unicontrol 33 results in coincident propagation of the two command signals required to actuate coincidence circuit 25 in a control chassis of the television receiver at the remote point.

It will be observed that coincidence circuit 25 is coupled to control tubes 17 and 20 which actuate tuning relays 19 and 22 to perform opposed control functions within the television receiver. In other words, relay 19, when energized, causes the tuning turret to be rotated in one direction and relay 22 initiates rotation of the turret in the opposite direction. Where both relays are actuated concurrently, they, in effect, cancel or neutralize one another so that no channel selection occurs, assuming that the two command signals are of equal duration and are received in time coincidence. Where the coincidence circuit is coupled to other control tubes, which effect wholly unrelated, as distinguished from opposing, control functions within the television receiver, it will in general be necessary to provide inhibiting so that the function resulting from the coincident reception of two command signals does not necessarily occasion actuation of the controlled devices that either command signal when received alone, establishes. A suitable inhibiting circuit is included in the modification of Figure 3.

In this modification, relay 26 serves primarily to control muting of the television receiver but it is associated with and controls another relay 40. The energizing coil 41 of that relay may be connected in series with the energizing coil of muting relay 26 in the anode circuit of the control tube of the coincidence arrangement 25. Relay 40 has two armatures 42 and 43 which may break two circuits identified by the legend "To motor-control circuit." Each of these, in turn, is controlled by channel-selection relays 19 and 22, assuming that armatures 42 and 43 are closed. Relay 40 is of the slow-release type so that once energized to displace armatures 42 and 43 away from the circuit contacts against which they normally abut, the armatures are not restored until the passage of a preselected time interval subsequent to the de-energization of relay coil 41.

Figure 3:
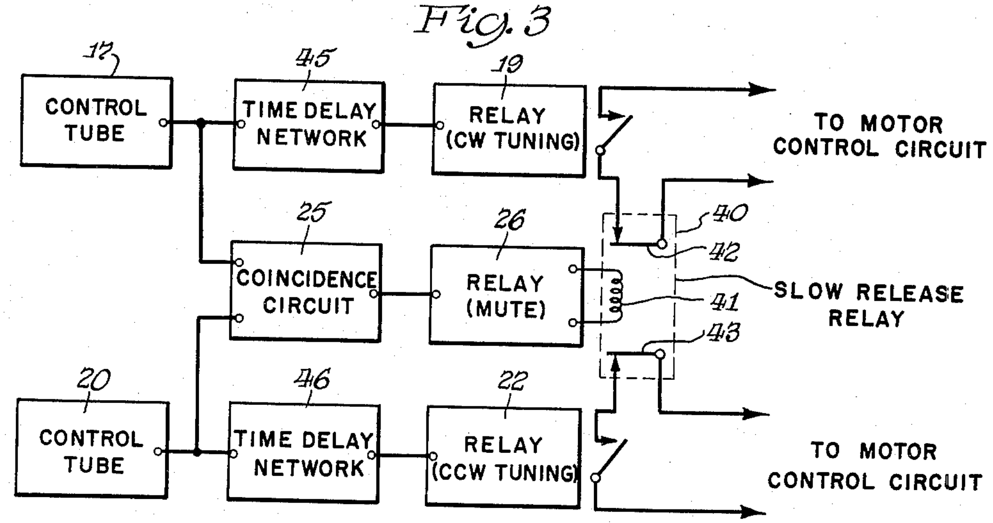
Figures 3 and 4 are block diagrams of different modifications of the control system of Figure 1.

In addition to relay 40, constituting an inhibiting device for disabling the control channels including the relays 19 and 22, the modification of Figure 3 includes two time-delay networks 45, 46 preceding relays 19 and 22, respectively. The connection to coincidence circuit 25 from control tubes 17 and 20 excludes the delay networks from the muting channel.

In operation, the arrangement of Figure 3 is the same in all material respects as the first-described modification of Figure 1. The reception of a single command signal, of such frequency as to render control tube 17 or 20 conductive, results in the actuation of relay 19 or 22, but only after a time delay introduced by networks 45 or 46. Aside from this injected delay, the response of the system to single command signals is precisely the same as that described in connection with the arrangement of Figure 1.

The coincident reception of two command signals of the frequencies required to apply control signals to the two inputs of coincidence circuit 25 causes the actuation of relay 26 and inhibiting relay 40 before relays 19 and 22 can be energized because of the shorter signal transmitting time of the channel including coincidence circuit 25. Actuation of relay 40 attracts armatures 42 and 43, displacing them from engagement with the contacts that they normally engage as indicated in the drawing. This opens both motor-control circuits and, in effect, disables the channels including relays 19 and 22. The time delay introduced by networks 45 and 46 permits the protection of the inhibiting relay to be realized even though one of the two command signals may reach the control station slightly ahead of the other. The slow-release feature of inhibiting relay 40 retards the return of armatures 42, 43 to the operating position represented in Figure 3 for a slight time interval after relay coil 41 becomes de-energized. The slow-release feature extends the protection of the inhibiting circuit and prevents operation of relays 19, 22 in the event that one of the command signals should endure slightly after the termination of the other.

In certain installations, particularly where the controlled function is executed by energizing a motor circuit, there is an inherent delay between the actuation of the control relay and the driving effect of the motor. Where the delay is appreciable, it may not be necessary to include a delay network such as units 45 and 46 in adding the inhibiting circuit to the control chassis.

Figure 4:
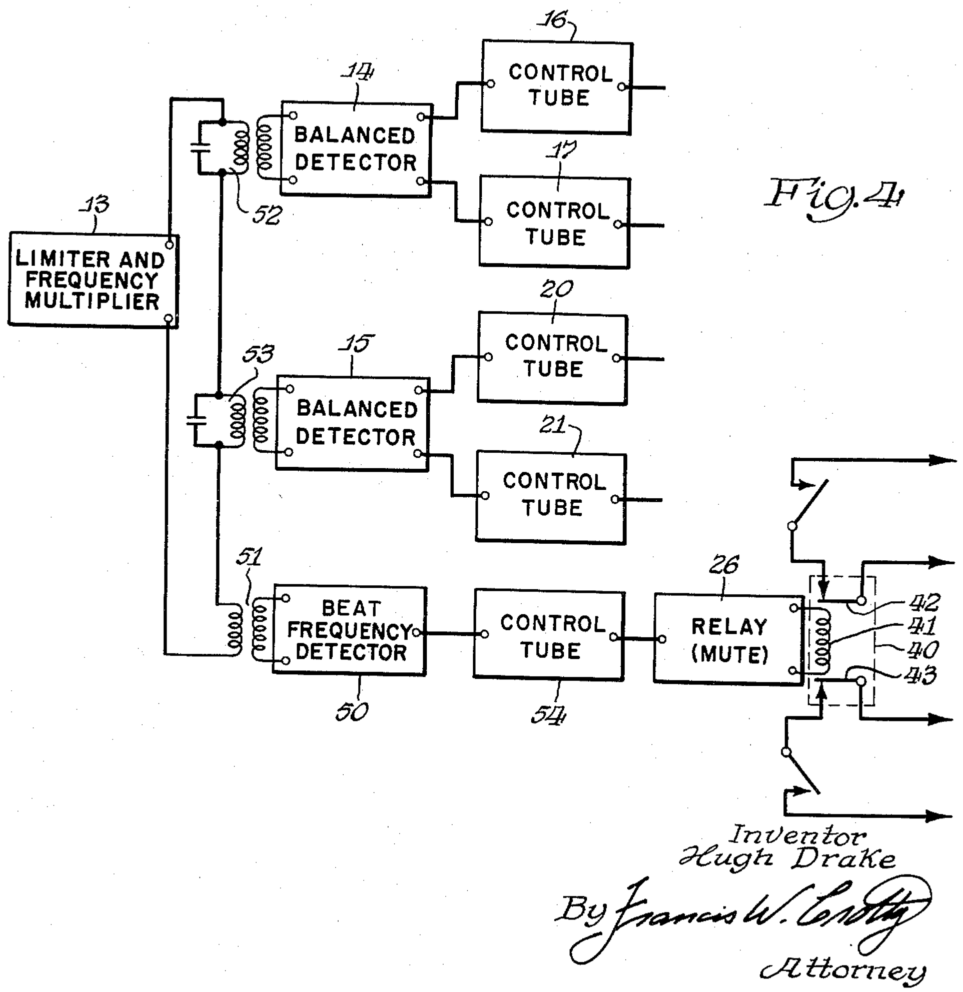

A further modification of the control system, shown in Figure 4, demonstrates the fact that an additional control function may be added to the system, without increasing the number of command signals required, by making use of the beat note or beat frequency obtainable during the coincident reception of a pair of command signals having different frequencies. In this arrangement, the added channel comprises a beat frequency detector 50 which is coupled to the output circuit of limiter and frequency multiplier 13 by means of a coupling transformer 51. The primary winding of that transformer is in series in the output circuit of unit 13 with the frequency selective networks 52, 53 which effect separation of the four command frequencies into two pairs, one of each being associated with detectors 14, 15 respectively, as described in the Adler patent. Transformer 51 and the input circuit to beat detector 50 may be made frequency selective, although its acceptance band must be wide enough to accept the two signals from which a modulation product or beat frequency is to be derived. Some freedom in design is achieved by employing those two of the four command signals which have the greatest frequency separation as the signal components to establish a beat frequency. A control tube 54 is coupled to an output circuit of detector 50 tuned to the beat frequency and, in turn, controls muting relay 26. Preferably, an inhibiting circuit is associated with relay 26 in the manner of Figure 3.

The remote control system of Figure 4 operates in the same manner as the arrangement of Figure 3. The only difference has to do with the derivation of a signal to actuate muting relay 26. In the arrangement of Figure 4, the coincident reception of two command signals, having a frequency separation corresponding to the beat frequency to which detector 50 is tuned, establishes a control signal of positive polarity which renders control tube 54 conductive. Conduction in control tube 54 energizes the operating winding of relay 26 and accomplishes muting.

In each of the described arrangements, the transmitter includes only four sonic generators and, therefore, is able to transmit only four different command signals. In spite of this restriction on the transmitter, limiting the number of command signals, a larger number of control functions is accomplished at the satellite station. Additional controls are possible by assigning a unique interpretation to two concurrently or co-extensively received command signals. In the arrangements of Figures 1 and 3 coincident command signals estabilsh control potentials of positive polarity at the two input circuits of a coincidence device which responds and causes a particular control function to be accomplished. The modification of Figure 4 operates upon concurrently-received carrier-frequency signals, exercising a particular control in the satellite station when the two carriers produce a beat frequency of a particular value.

While particular embodiments of the invention have been shown and described, it will be obvious to those skilled in the art that changes and modifications may be made without departing from the invention in its broader aspects, and, therefore, the aim in the apepnded claims is to cover all such changes and modifications as fall within the true spirit and scope of the invention.

I claim:

1. A remote control system for accomplishing three control functions in response to commands constituted of two signals of different frequencies comprising: a receiver for accepting said signals; a first control channel coupled to said receiver and responsive only at the frequency of one of said signals for developing a first control effect; a second control channel coupled to said receiver and responsive only at the frequency of the other of said signals for developing a second control effect; a third control channel coupled to said receiver and responsive only at the beat frequency of said two signals to develop a third control effect; and three utilizing devices coupled to said first, second and third channels respectively for perfoming any of three controlled functions in accordance with which of said control effects is instantaneously developed.

2. A remote control system for accomplishing three control functions in response to commands constituted of two signals of different frequencies comprising: a receiver for accepting said signals; a first control channel coupled to said receiver and responsive only at the frequency of one of said signals for developing a first control effect; a second control channel coupled to said receiver and responsive only at the frequency of the other of said signals for developing a second control effect; a third control channel coupled to said receiver and responsive only to a modulation product of said two signals to develop a third control effect; and three utilizing devices coupled to said first, second and third channels respectively for performing any of three controlled functions in accordance with which of said control effects is instantaneously developed.

3. A remote control system for accomplishing three control functions in response to commands constituted of two signals comprising: a receiver for accepting said signals; a first control channel coupled to said receiver and responsive only to one of said signals for developing a first control effect; a second control channel coupled to said receiver and responsive only to the other of said signals for developing a second control effect; a third control channel coupled to said receiver and responsive only to the coincident reception of said two signals to develop a third control effect; an inhibiting circuit coupled between said third channel and at least one of said other channels for disabling said one other channel in response to the coincident reception of said two signals; and three utilizing devices coupled to said first, second and third channels respectively for performing any of three controlled functions in accordance with which of said control effects is instantaneously developed.

4. A remote control system for accomplishing three control functions in response to commands constituted of two signals comprising: a receiver for accepting said signals; a first control channel coupled to said receiver and responsive only to one of said signals for developing a first control effect; a second control channel coupled to said receiver and responsive only to the other of said signals for developing a second control effect; a third control channel coupled to said receiver and responsive only to the coincident reception of said two signals to develop a third control effect; an inhibiting circuit coupled between said third channel and said first and second channels for disabling said first and second channels in response to the coincident reception of said two signals; and three utilizing devices coupled to said first, second and third channels respectively for performing any of three controlled functions in accordance with which of said control effects is instantaneously developed.

5. A remote control system for accomplishing three control functions in response to commands constituted of two signals comprising: a receiver for accepting said signals; a first control channel coupled to said receiver and responsive only to one of said signals for developing a first control effect; a second control channel coupled to said receiver and responsive only to the other of said signals for developing a second control effect; a third control channel coupled to said receiver and responsive only to the coincident reception of said two signals to develop a third control effect; an inhibiting circuit coupled between said third channel and said first and second channels for disabling said first and second channels in response to the coincident reception of said two signals; a slow release relay included in said circuit for enabling said first and second channels a predetermined time subsequent to the interruption of said coincident reception of said signals; and three utilizing devices coupled to said first, second and third channels respectively for performing any of three controlled functions in accordance with which of said control effects is instantaneously developed.

6. A remote control system for accomplishing three control functions in response to commands constituted of two signals comprising: a receiver for accepting said signals; a first control channel including a time-delay network coupled to said receiver and responsive only to one of said signals for developing a first control effect; a second control channel including a time-delay network coupled to said receiver and responsive only to the other of said signals for developing a second control effect; a third control channel coupled to said first and second channels to include portions thereof exclusive of said time-delay networks and responsive only to the coincident reception of said two signals to develop a third control effect; an inhibiting circuit coupled between said third channel and said first and second channels for disabling said first and second channels in response to the coincident reception of said two signals; and three utilizing devices coupled to said first, second and third channels respectively for performing any of three controlled functions in accordance with which of said control effects is instantaneously developed.

7. A remote control system for accomplishing three control functions in response to commands constituted of two signals comprising: a receiver for accepting said signals; a first control channel coupled to said receiver and responsive only to one of said signals for developing a first control effect; a second control channel coupled to said receiver and responsive only to the other of said signals for developing a second control effect; a third control channel coupled to said receiver having a shorter signal-translating time than said first and second channels and responsive only to the coincident reception of said two signals to develop a third control effect; an inhibiting circuit coupled between said third channel and said first and second channels for disabling said first and second channels in response to the coincident reception of said two signals; a slow release relay included in said circuit for enabling said first and second channels a predetermined time subsequent to the interruption of said coincident reception of said signals; and three utilizing devices coupled to said first, second and third channels respectively for performing any of three controlled functions in accordance with which of said control effects is instantaneously developed.

8. A remote control system for accomplishing three control functions in a controlled apparatus in response to commands constituted of two signals comprising: a receiver for accepting said signals; a first control channel coupled to said receiver and responsive only to one of said signals for developing a first control effect; a second control channel coupled to said receiver and responsive only to the other of said signals for developing a second control effect; a third control channel coupled to said receiver and responsive only to the coincident reception of said two signals to develop a third control effect; a pair of utilizing devices coupled to said first and second channels, respectively, for performing opposed control functions in said apparatus; and a third utilizing device coupled to said third channel for performing a third control function in said apparatus.

References Cited in the file of this patent

UNITED STATES PATENTS 2,658,942 Durkee ---------------- Nov. 10, 1953